No. 642,382. Patented Jan. 30, 1900.
J. STALEY.
GRASS LIGHTING TORCH.
(Application filed Feb. 26, 1898.)
(No Model.)
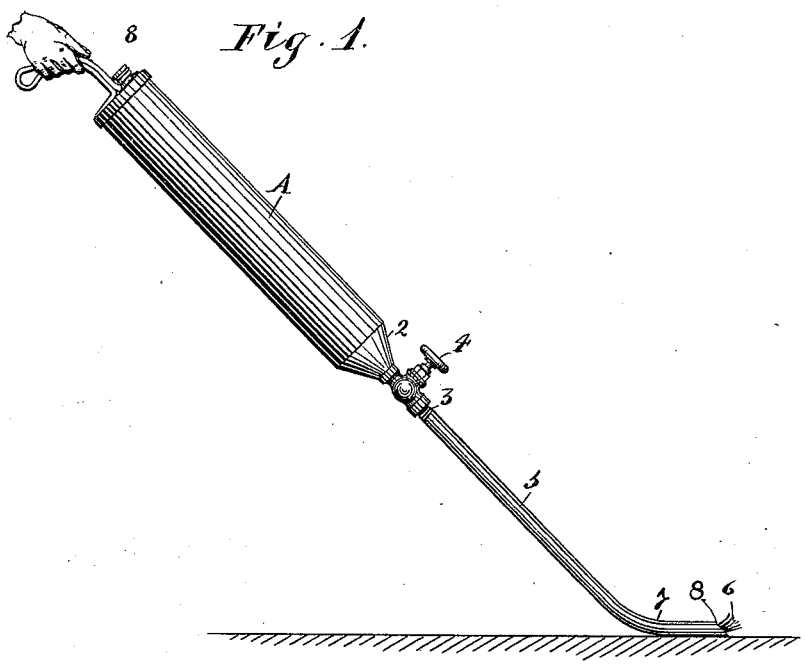
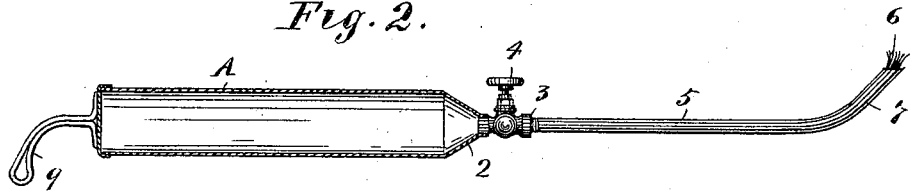
Witnesses.
A. H. Opsahl
[signature]
Inventor.
James Staley.
By his Attorneys
Merwin, Lothrop & Johnson
THE NORRIS PETERS CO., PHOTO-LITHO., WASHINGTON, D. C.

UNITED STATES PATENT OFFICE.

JAMES STALEY, OF BISMARCK, NORTH DAKOTA.

GRASS-LIGHTING TORCH.

SPECIFICATION forming part of Letters Patent No. 642,382, dated January 30, 1900.

Application filed February 26, 1898. Serial No. 671,723. (No model.)

*To all whom it may concern:*

Be it known that I, JAMES STALEY, of Bismarck, Burleigh county, North Dakota, have invented certain Improvements in Grass-Lighting Torches, of which the following is a specification.

My invention consists of a torch or burner adapted for use in kindling prairie-grass for the purpose of burning the grass from a strip of ground to constitute a fire-break.

To this end my invention consists in the construction hereinafter particularly described and claimed.

In the accompanying drawings, forming part of this specification, Figure 1 is a side elevation of my device shown in the hand of the user and in position for use, and Fig. 2 is a longitudinal cross-section of the same.

The device consists of a reservoir A, provided at its lower end with an outlet-opening 2, in which is arranged a coupling 3, provided with a suitable controlling-valve 4. Adapted to be secured in said coupling is the pipe 5, in which is arranged a suitable wick 6. The lower end 7 of the pipe is deflected at such an angle with the main body of the pipe as to lie parallel with the ground when the device is held in the position shown in Fig. 1, this being the position that the device would naturally be held in by a person while walking. The upper end of the reservoir A is provided with a suitable inlet-opening covered by a cap 8, through which the reservoir is filled. A suitable handle 9 is also secured to the upper end for the purpose of being grasped by the user.

In use, the reservoir being filled with kerosene, the valve 4 is opened sufficiently to allow the wick to be saturated. The wick then being lighted, the user grasps the handle of the device, dragging the end of the wick-holding pipe along the ground, as shown in Fig. 1, and thus lighting the grass. By having the pipe 5 detachably connected with the reservoir, as shown, the pipe can be removed to allow the insertion of a new wick or the removal or forcing downward of the inclosed one. The end of the wick-holding pipe being formed with bevel 8 leaves exposed the upper portion of the wick end, while holding the wick end out of contact with the ground. This keeps the flame from being extinguished, as would be the case if the pipe did not have the beveled end and the wick end dragged on the ground.

I claim—

A device of the class described, comprising in combination the reservoir, the wick-holding pipe detachably secured to said reservoir, and having its lower end deflected, with the end of said deflected portion rearwardly beveled, the controlling-valve in said pipe, and the handle for said device.

In testimony whereof I affix my signature in presence of two witnesses.

JAMES STALEY.

Witnesses:
  C. H. GILBERT,
  M. L. THAUWALD.